W. Y. SINGLETON.
Hominy Machine.
No. 4,486. Patented April 25, 1846.
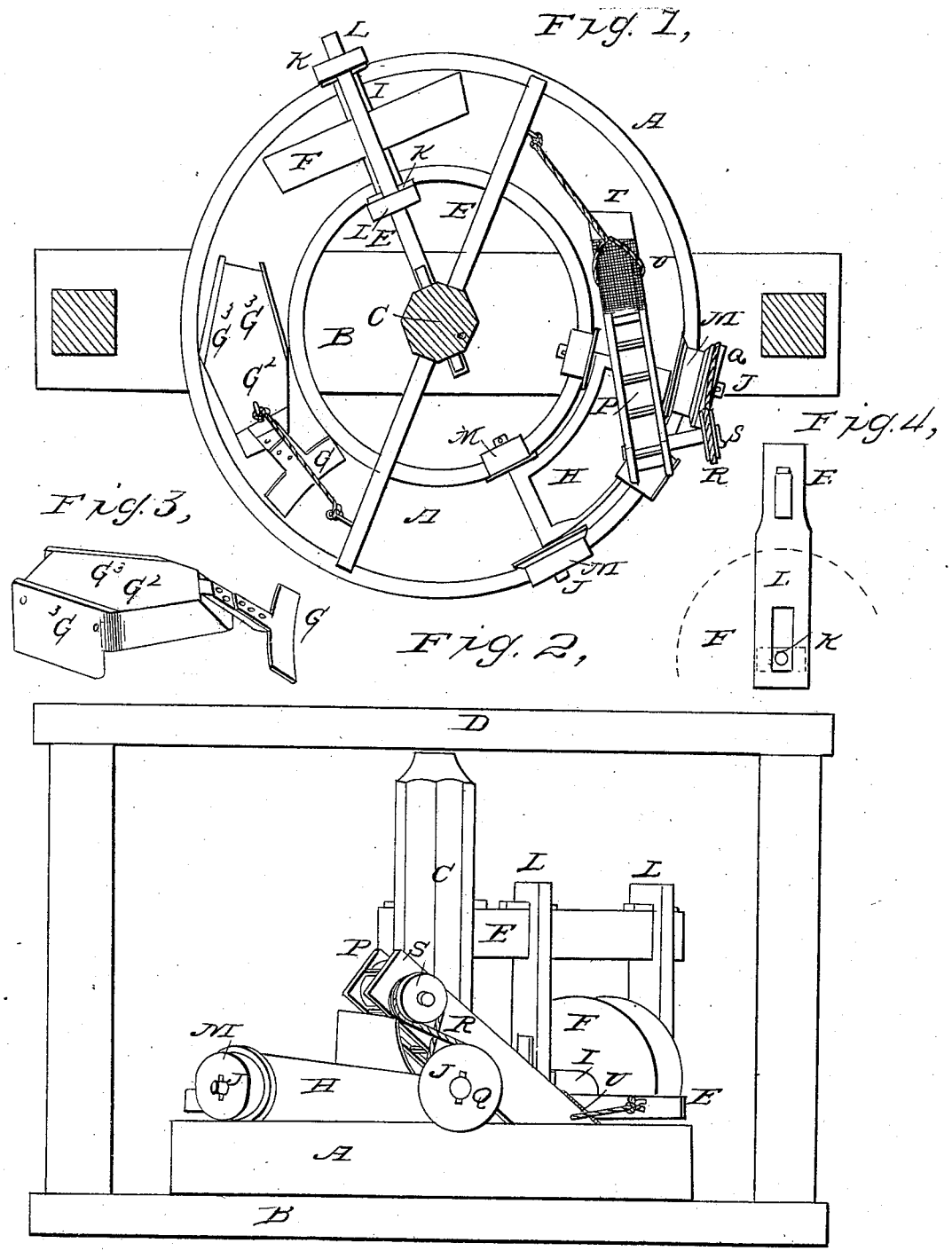

UNITED STATES PATENT OFFICE.

WILLIAM Y. SINGLETON, OF SPRINGFIELD, ILLINOIS.

IMPROVEMENT IN HOMINY MAKING.

Specification forming part of Letters Patent No. 4,486, dated April 25, 1846.

*To all whom it may concern:*

Be it known that I, WILLIAM Y. SINGLETON, of Springfield, in the county of Sangamon and State of Illinois, have invented a new and useful Machine for Making Hominy, which is described as follows, reference being had to the annexed drawings of the same, making part of this specification.

Figure 1 is a plan. Fig. 2 is a side elevation. Fig. 3 is a perspective view of the mole or stirrer detached or taken from the trough. Fig. 4 is one of the hanging arms and sliding boxes.

This machine consists of a circular trough A, made of proper size and material for containing the corn to be converted into hominy, placed upon a solid foundation B. In the center of this circular trough is placed a vertical shaft C, whose lower gudgeon turns in a suitable box on the foundation and whose upper gudgeon turns in a box in a suitable cap D, supported by posts or other means. In this shaft are inserted radial arms E, to one of which is attached a wheel F for operating on the corn in the trough. To another of said arms is attached a mole or scraper G for stirring and gathering the corn into a ridge in the middle of the circular trough for the wheel F to pass over it; and to another of the radial arms is attached a combined traveling scraper, sieve, elevator, and receiver H for scraping and sieving the hominy and separating the finer from the coarser particles and elevating the former to said receiver H.

The wheel F for breaking the corn is a solid cylinder of stone or other suitable material having a horizontal shaft I in its center, whose gudgeons turn in sliding boxes K, placed in oblong openings made in parallel hanging arms L, connected to one of the aforesaid radial arms E, said sliding boxes allowing the wheel to rise and fall as it passes over the corn without straining its shaft.

The scraper G for scraping or stirring and ridging the corn preparatory to the wheel passing over it is made in the form of the letter T inverted and slightly concave in its lower front edge and fastened to a diamond-shaped block $G^2$ in a standing position for the purpose before stated of scraping or stirring the corn from the bottom of the trough and directing it toward its outer and inner sides as it slides over the upper edges of the scraper. The hind part of said diamond-shaped block $G^2$ is provided with two wings $G^3$, inclining toward each other for the purpose of scraping or gathering the corn into a ridge in the middle of the trough directly in front of the wheel, which passes over it.

The box or receiver H for receiving the meal and bran as separated from the hominy is made the segment of a circle, and has two axles J and four wheels M, which turn on the outer and inner rims or sides of the circular trough A. To the front end of this segment receiver is attached an endless elevator P for elevating the meal from the trough and depositing it into the receiver, which elevator is turned by a pulley Q, placed on the side of one of the aforesaid wheels M, around which a band R is passed, leading around a pulley S on the end of the axle of one of the drums or cylinders carrying the endless elevator P.

To the front and lower end of the elevator-frame is attached an inclined scraper T for scraping the corn and meal from the bottom of the trough and conducting it onto an inclined screen U, secured to the elevator-frame above said scraper for the purpose of separating the meal and corn, the former passing through the screen to the elevator P and the latter sliding over and falling off its sides into the trough A, being slightly raised in the middle for that purpose.

What I claim as my invention, and desire to secure by Letters Patent, is—

1. The combination of the scraper T, sieve U, and revolving elevator P with the segment traveling receiver H, combined, arranged, and operated in the manner and for the purpose set forth.

2. The combination of the stirrer G and inclined wings $G^3$ with the block $G^2$, to which they are connected, as arranged, for the purpose set forth.

W. Y. SINGLETON.

Witnesses:
WM. P. ELLIOT,
ALBERT E. H. JOHNSON.